Patented May 30, 1950

2,509,585

UNITED STATES PATENT OFFICE 2,509,585

PROCESS OF TREATING BARIUM AND STRONTIUM SULFATES

Charles Raymond Brown, Llanerch, Pa., assignor to G. and W. H. Corson, Inc., Plymouth Meeting, Pa., a corporation of Delaware No Drawing. Application April 30, 1946, Serial No. 666,188

5 Claims. (Cl. 23—122)

The present invention relates to a process for the purification of native barium and strontium sulphates, and more particularly it relates to a process by which the iron compounds physically associated with and discoloring the barium and strontium sulphates may be readily removed.

Barytes (native barium sulphate) and celestite or celestine (native strontium sulphate) are often contaminated by iron compounds physically associated in the ore with the result that the ores are noticeably discolored and at times are of a distinctly red or brownish red coloration. The presence of these iron compounds in the ores has interfered with the use thereof as a source of barium or strontium compounds, since the iron may not be removed in the normal processing of the ore in which case it is present as a contaminant in the barium and strontium products obtained therefrom.

In addition to this type of iron compound, there is also often present in the native barium or strontium sulphates a type of iron which is chemically bound in the molecular structure of the ore. This latter type of iron does not impart the objectionable discoloration to the ore and is not generally affected by the process of the present invention. The total amount of iron contained in the ores under discussion varies from a few tenths percent to 2% or 3% or even more (calculated as $Fe_2O_3$). Of this total iron, the major portion thereof is often the type of iron that is physically associated with the ore. In a typical case, the total iron of barytes was 1.5% (calculated as $Fe_2O_3$) and of this, only about 0.35% was iron combined molecularly in the ore. It will therefore be seen that a process by which the physically associated iron compounds which discolor the ores and the resultant products obtained therefrom is an important advance in the utilization of these ores.

The principal object of the present invention, therefore, is to provide a simple and inexpensive process by which the iron compounds physically associated with and contaminating native barium and strontium sulphates may be readily removed therefrom.

Other objects will be apparent from a consideration of this specification and the claims.

In accordance with the present invention, a finely divided barium or strontium sulphate ore, for example a floated ore discolored by iron compounds is treated with an aqueous solution of a dissociatable, water-soluble soap. If desired, the treatment may be carried out in connection with the water flotation process, that is after the ore has been separated by water flotation and before it is dry. The treatment with the aqueous solution of the dissociatable water-soluble soap merely involves the thorough mixing of the solution with the ore and sufficient water, preferably water low in calcium and magnesium compounds, is used in the treatment so that the ore may be suspended as a slurry in the aqueous medium. Throughout the period of reaction, the reacting mixture is agitated. The aqueous medium employed in accordance with the present process will, of course, be a single phase aqueous medium, that is, it will be substantially free of insoluble liquid organic material such as oil and the like, as used in ore flotation procedures to prevent wetting of the ore particles, and thus the present process is to be distinguished from ore flotation procedures.

While the iron compounds may be removed by the treatment of the ore at room temperature if sufficient time is allowed, the treatment is preferably carried out at a temperature between about 40° C. and about 90° C. If desired, the treatment may be conducted at a temperature at which the solution of the soap boils, but nothing is to be gained by the use of this higher temperature and, in fact, the use of a temperature above 90° C., as well as the use of a temperature below 40° C., is not recommended since a light, highly dispersed suspension of the ore is obtained. This type of ore suspension does not settle rapidly and completely and is to be contrasted to the heavier, rapidly settling suspension of the ore which results when the treatment is carried out at temperatures between about 40° C. and about 90° C. The ore, soap and water may be mixed in the cold and the mixture heated to the desired temperature or a hot solution of the soap may be added to the ore.

After the reaction is completed, which takes place in a matter of minutes when a temperature above 40° C. is used, the ore is settled in the aqueous medium and the aqueous medium is removed from the settled ore. For example, the reaction mixture may be centrifuged or may be treated in a thickener which both removes the iron compound and washes the ore in a counter-current manner. In place of this, the reaction mixture may be allowed to settle in a quiescent manner and the supernatant liquor in which there is present colloidal iron soap is decanted, syphoned, or otherwise removed from the settled ore. After the treatment the ore is washed to remove any adhering iron compound and the excess soap solution. If the ore contains a large amount of physically associated iron compounds, it may be advantageous to repeat the treatment described two or more times.

As stated above, the ore is treated with sufficient aqueous solution so that a slurry thereof is formed. The concentration of the soap solution used is relatively unimportant so long as there is sufficient water present to provide the slurry. Satisfactory results have been obtained using a soap solution of a concentration of a few tenths percent up to 10% or even more, but in the preferred embodiment a concentration of between about 1% and 2% is used.

The amount of soap employed in the process will be sufficient to combine with the iron compounds physically associated with the ore and, as an estimation of the amount of soap required, the figure of double the weight of sodium soap as compared to the physically associated iron content (figured as $Fe_2O_3$) may be used.

The soap employed in accordance with the present invention may be selected from a wide variety of the products formed by the saponification or neutralization of fats, oils, waxes and the like, or their acids, with inorganic or organic bases, provided however, that the resulting product is appreciably dissociatable and is soluble in water. Preferably the anion of the soap is a fatty acid anion of at least 12 carbon atoms and the fatty acid anions may be saturated or unsaturated and may or may not contain hydroxyl or other non-functional groups. Examples of the fatty acid anions that may be used are: lauric, palmitic, stearic, myristic, behenic, arachidic, oleic, ricinoleic, linoleic and linolenic. The use of an inorganic cation rather than an organic cation, is also advantageous, particularly from the standpoint of cost, and examples of the inorganic cations are: sodium potassium and ammonium ions. In the preferred embodiment of the invention a sodium soap of a fatty acid containing at least 12 carbon atoms is used. It is to be understood of course, that mixtures of soaps particularly mixtures of the soaps of the various fatty acids will often be used since they are cheaper than the pure compounds.

In a specific example, 100 parts of a floated reddish-brown barium sulphate ore containing 1.5% of iron compounds (calculated as $Fe_2O_3$) was mixed with 200 parts of a 1% solution of a mixture of sodium salts of fatty acids containing more than 12 carbon atoms. The mixture was heated to 80° C. with continuous agitation and as soon as this temperature was reached, the reaction between the soaps and the iron compound was completed and the reaction mass was allowed to settle. The supernatant liquor was decanted and the ore which had settled to the bottom of the vessel was washed with water and then dried. An analysis showed that the iron content of the ore had been reduced to 0.35% (calculated as $Fe_2O_3$) which corresponds substantially to the iron present in the ore molecularly bound in the ore structure. The color of the product had changed from the reddish brown to a slightly grayish white.

While the particular phenomenon involved in the removal of the iron compounds is not fully understood, it appears to be dependent in part upon the exchange of the iron ions with the soluble cations of the soap and to the colloidal characteristic of the resulting compounds.

Considerable modification is possible in the selection of dissociatable soluble soap employed in the process, as well as in the physical steps thereof, without departing from the essential features of the invention.

I claim:

1. The process for the treatment of ores selected from the group consisting of native barium and strontium sulphates, said sulphates being discolored by iron compounds physically associated therewith, to form a substantially white sulphate by removal of iron compounds therefrom, which comprises agitating said ore in finely divided form in a single phase aqueous medium, maintained at a temperature above about 40° C. and below its boiling point, in which the ore is capable of settling and which contains a dissociatable water-soluble soap of a fatty acid having at least 12 carbon atoms in solution, said soap being present in said medium in an amount at least substantially sufficient to combine with the iron compounds physically associated with the ore, and said aqueous medium being substantially free of insoluble liquid organic material; settling said ore in said aqueous medium containing the combined soap and iron compounds, and removing said aqueous medium from said settled ore.

2. The process of claim 1 wherein the ore is treated with an aqueous solution of a soluble soap having an inorganic cation and a fatty acid anion containing at least 12 carbon atoms at a temperature of from about 40° C. to about 90° C.

3. The process of claim 1 wherein the ore is treated with an aqueous solution of a sodium soap of a fatty acid containing at least 12 carbon atoms at a temperature of from about 40° C. to about 90° C.

4. The process for the treatment of native barium sulphate ore discolored by iron compounds physically associated therewith, to form a substantially white sulphate by removal of iron compounds therefrom, which comprises agitating said ore in finely divided form in a single phase aqueous medium, maintained at a temperature above about 40° C. and below its boiling point, in which the ore is capable of settling and which contains in solution a dissociatable water-soluble soap having an inorganic cation and a fatty acid anion containing at least 12 carbon atoms, said soap being present in said medium in an amount at least substantially sufficient to combine with the iron compounds physically associated with the ore, and said aqueous medium being substantially free of insoluble liquid organic material; settling said ore in said aqueous medium containing the combined soap and iron compounds, and removing said aqueous medium from said settled ore.

5. The process of claim 4 wherein the ore is treated with an aqueous solution of a sodium soap of a fatty acid containing at least 12 carbon atoms at a temperature of from about 40° C. to about 90° C.

CHARLES RAYMOND BROWN.

REFERENCES CITED

The following references are of record in the file of this patent:

UNITED STATES PATENTS

| Number | Name | Date |
|---|---|---|
| 2,105,827 | Tartaron | Jan. 18, 1938 |